(12) United States Patent
Chen et al.

(10) Patent No.: US 9,709,091 B2
(45) Date of Patent: Jul. 18, 2017

(54) SLIDE RAIL ASSEMBLY

(71) Applicants: KING SLIDE WORKS CO., LTD., Kaohsiung (TW); KING SLIDE TECHNOLOGY CO.,LTD., Kaohsiung (TW)

(72) Inventors: Ken-Ching Chen, Kaohsiung (TW); Shun-Ho Yang, Kaohsiung (TW); Chun-Yi Ho, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 43 days.

(21) Appl. No.: 14/954,966

(22) Filed: Nov. 30, 2015

(65) Prior Publication Data

US 2017/0082143 A1 Mar. 23, 2017

(30) Foreign Application Priority Data

Sep. 18, 2015 (TW) .............................. 104131080 A

(51) Int. Cl.
*A47B 88/04* (2006.01)
*F16C 29/12* (2006.01)
*A47B 88/49* (2017.01)
*A47B 88/423* (2017.01)

(52) U.S. Cl.
CPC .............. *F16C 29/12* (2013.01); *A47B 88/49* (2017.01); *A47B 2088/4235* (2017.01); *A47B 2210/007* (2013.01); *F16C 2314/72* (2013.01)

(58) Field of Classification Search
CPC ......... F16C 29/12; A47B 88/16; A47B 88/49; A47B 2210/0018; H04K 7/1489
USPC ............ 312/330.1, 334.1, 333, 334.7, 334.8, 312/334.44, 334.47
See application file for complete search history.

(56) References Cited

U.S. PATENT DOCUMENTS

| | | | | |
|---|---|---|---|---|
| 3,133,768 A | * | 5/1964 | Klakovich | ............. A47B 88/49 312/323 |
| 6,997,529 B1 | * | 2/2006 | Chen | .................... A47B 88/493 312/334.44 |
| 7,604,307 B2 | | 10/2009 | Greenwald | |
| 8,403,436 B2 | * | 3/2013 | Yu | ........................ H05K 7/1489 312/333 |
| 9,279,280 B1 | | 3/2016 | Chen | |

(Continued)

FOREIGN PATENT DOCUMENTS

| | | |
|---|---|---|
| JP | 2003310369 A | 11/2003 |
| JP | 3194393 U | 11/2014 |

*Primary Examiner* — James O Hansen
(74) *Attorney, Agent, or Firm* — Winston Hsu

(57) ABSTRACT

A slide rail assembly comprises a first rail, a second rail, a third rail, a blocking element and an engagement element. The first rail has a blocking part. The blocking element is connected to the second rail. When the second rail is located at a retrieve position relative to the first rail, and the engagement element is operatively connected to the blocking element for moving the blocking element from a first predetermined position to a second predetermined position relative to the second rail, only the third rail can move relative to the second rail when the slide rail assembly is extended along an extension direction, in order to adjust extension length of the slide rail assembly.

9 Claims, 12 Drawing Sheets

(56) References Cited

U.S. PATENT DOCUMENTS

| | | | |
|---|---|---|---|
| 2006/0288529 A1* | 12/2006 | Chen ................... | A47B 88/493 16/96 R |
| 2013/0016930 A1* | 1/2013 | Fan ..................... | H05K 7/1489 384/35 |
| 2014/0265788 A1* | 9/2014 | Judge .................. | H05K 7/1489 312/334.1 |

* cited by examiner

SLIDE RAIL ASSEMBLY

BACKGROUND OF THE INVENTION

1. Field of the Invention

The present invention relates to a slide rail assembly, and more particularly, to a slide rail assembly capable of adjusting extension length.

2. Description of the Prior Art

U.S. Pat. No. 6,997,529 B1 invented by Chen et al. discloses a synchronizing device for a tri-sector slide. The disclosed slide includes a loading rail secured to a fixed rail for loading a sliding rail, such that the sliding rail and the loading rail can move back and forth relative to the fixed rail along a same axial direction, wherein, the loading rail is pivoted with a linking plate at its rear end, the sliding rail comprises a protuberance corresponding to the linking plate, and the fixed rail comprises a releasing member. As such, when the sliding rail is pulled to extend, the protuberance abuts against the linking plate for driving the loading rail to slide simultaneously. The releasing member can push the linking plate to swing, for driving the protuberance to detach from the linking plate, in order to allow the sliding rail to extend along the loading rail to its extremity.

U.S. Pat. No. 7,604,307 B2 invented by Greenwald et al. discloses a sidewall of a chassis (32) having a plurality of mounting posts (30), and a telescoping slide assembly (14) for installing the chassis. The chassis can be installed in a cabinet (40) through a pair of the telescoping slide assemblies, such that the chassis can be easily maintained. Moreover, a plurality of chassis can be installed in the cabinet for effectively saving space.

However, in a limited space, since the aforementioned three-section telescoping slide assembly carries the chassis, it is inconvenient to maintain the chassis when the chassis is pulled out of the cabinet through the fully extended slide assembly.

SUMMARY OF THE INVENTION

An objective of the present invention is to provide a slide rail assembly capable of adjusting extension length in response to different environments.

According to an embodiment of the present invention, a slide rail assembly comprises a first rail, a second rail, a blocking element and an engagement element. The first rail has a blocking part. The second rail is movably connected to the first rail. The blocking element is connected to the second rail. Wherein, when the second rail is located at a retrieve position relative to the first rail, the engagement element is operatively connected to the blocking element for moving the blocking element from a first predetermined position to a second predetermined position relative to the second rail, and when the second rail is moved relative to the first rail along an extension direction, the blocking element abuts against the blocking part of the first rail, for preventing the second rail from moving relative to the first rail along the extension direction. Wherein, when the engagement element is operated to move the blocking element apart from the second predetermined position relative to the second rail, the second rail is able to move relative to the first rail along the extension direction.

According to the above embodiment of the present invention, the slide rail assembly further comprises a third rail movably connected to the second rail.

According to the above embodiment of the present invention, the third rail has an abutting feature, when the blocking element is located at the first predetermined position, the abutting feature abuts against the blocking element for driving the second rail to move with the third rail synchronously.

According to the above embodiment of the present invention, the engagement element is movably connected to the first rail.

According to the above embodiment of the present invention, the first rail has a first feature and a second feature, the engagement element is movably connected to the first rail between the first feature and the second feature.

According to the above embodiment of the present invention, the engagement element has a first blocking wall and a second blocking wall respectively located at two sides of the first feature of the first rail.

According to the above embodiment of the present invention, the slide rail assembly further comprises an elastic element for providing an elastic force to the blocking element to position the blocking element at the first predetermined position relative to the second rail in response to the elastic force of the elastic element.

According to the above embodiment of the present invention, one of the engagement element and the blocking element has an inclined guiding part for guiding the blocking element to easily move to the second predetermined position from the first predetermined position.

According to the above embodiment of the present invention, the second rail has a hole for allowing an extension part of the blocking element to pass through for facing toward the first rail.

According to another embodiment of the present invention, a slide rail assembly comprises a first rail, a second rail, a third rail, a blocking element and an engagement element. The first rail has a blocking part. The second rail is movably connected to the first rail. The third rail is movably connected to the second rail, and the third rail has an abutting feature. The blocking element is connected to the second rail. The engagement element is movably connected to the first rail. Wherein, when the second rail is located at a retrieve position relative to the first rail, the abutting feature of the third rail abuts against the blocking element for driving the second rail to move with the third rail synchronously. Wherein, when the second rail is located at the retrieve position relative to the first rail, and the engagement element is operatively connected to the blocking element for driving the blocking element to abut against the blocking part of the first rail with the abutting feature of the third rail no longer abutting against the blocking element, the second rail is prevented from moving relative to the first rail along an extension direction with the third rail being able to move relative to the second rail along the extension direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
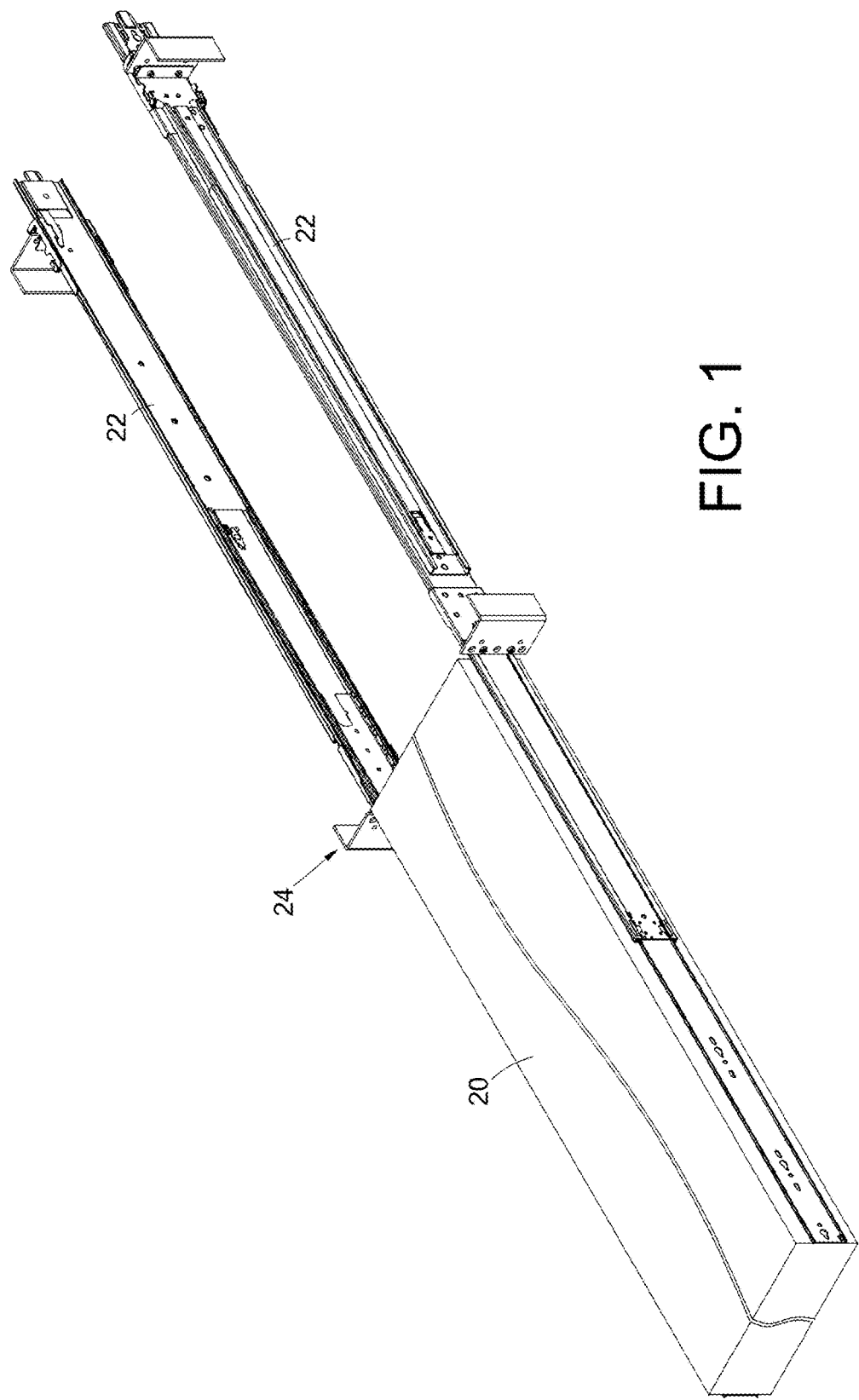
FIG. 1 is a diagram showing a slide rail assembly being fully extended for allowing a chassis to be completely outside a rack according to an embodiment of the present invention.

As shown in FIG. 1, a chassis 20 is mounted to a rack 24 through a pair of slide rail assemblies 22, and the pair of slide rail assemblies 22 are fully extended to move the chassis 20 to be completely outside the rack 24.

Figure 2:
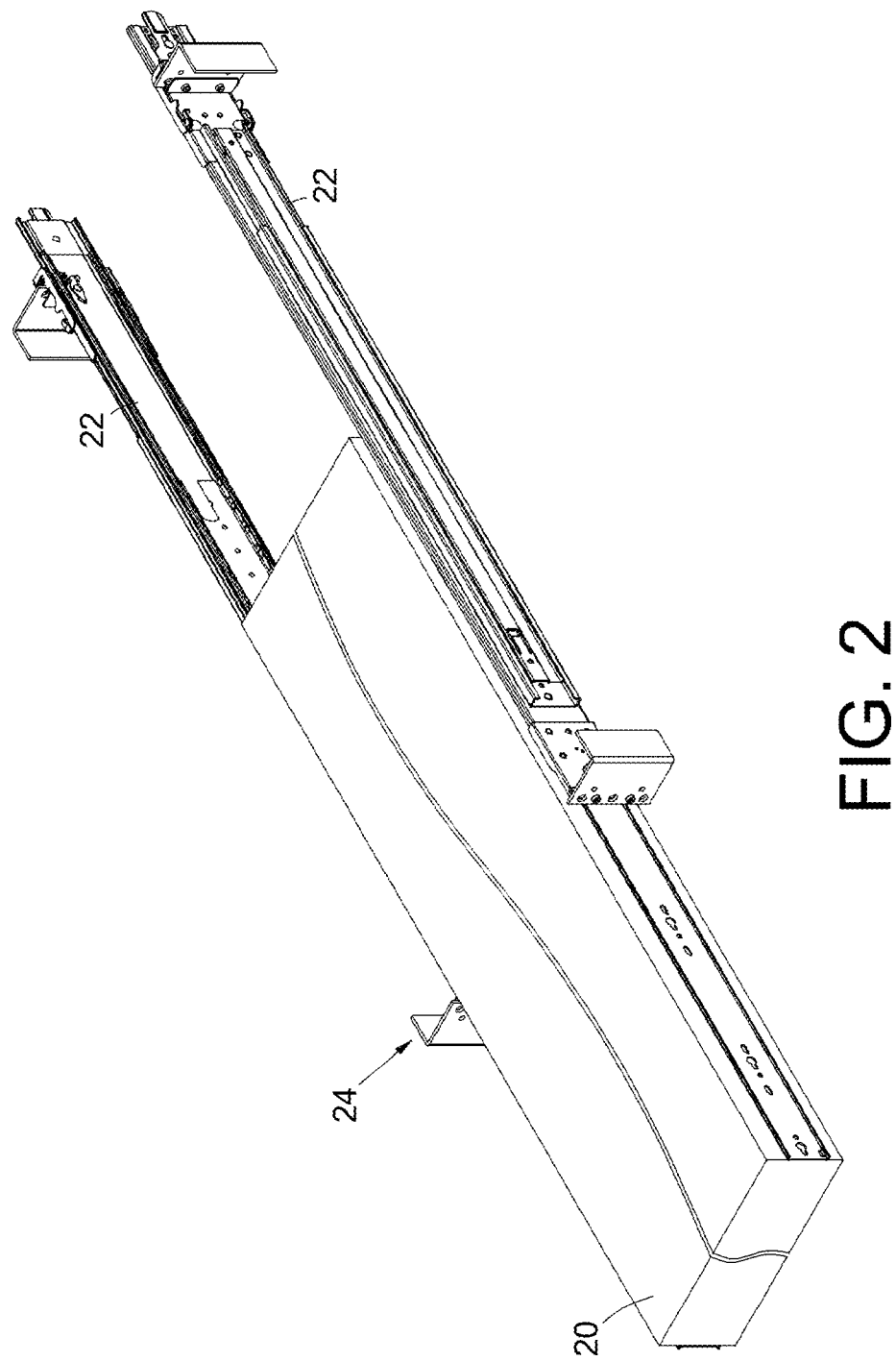
FIG. 2 is a diagram showing extension length of the slide rail assembly being adjusted for allowing the chassis to be partially outside the rack according to an embodiment of the present invention.

As shown in FIG. 2, extension length of the slide rail assemblies 22 is shortened for moving the chassis to be partially outside the rack 24. The operation mode in FIG. 2 requires a smaller extension space than the operation mode in FIG. 1.

Figure 3:
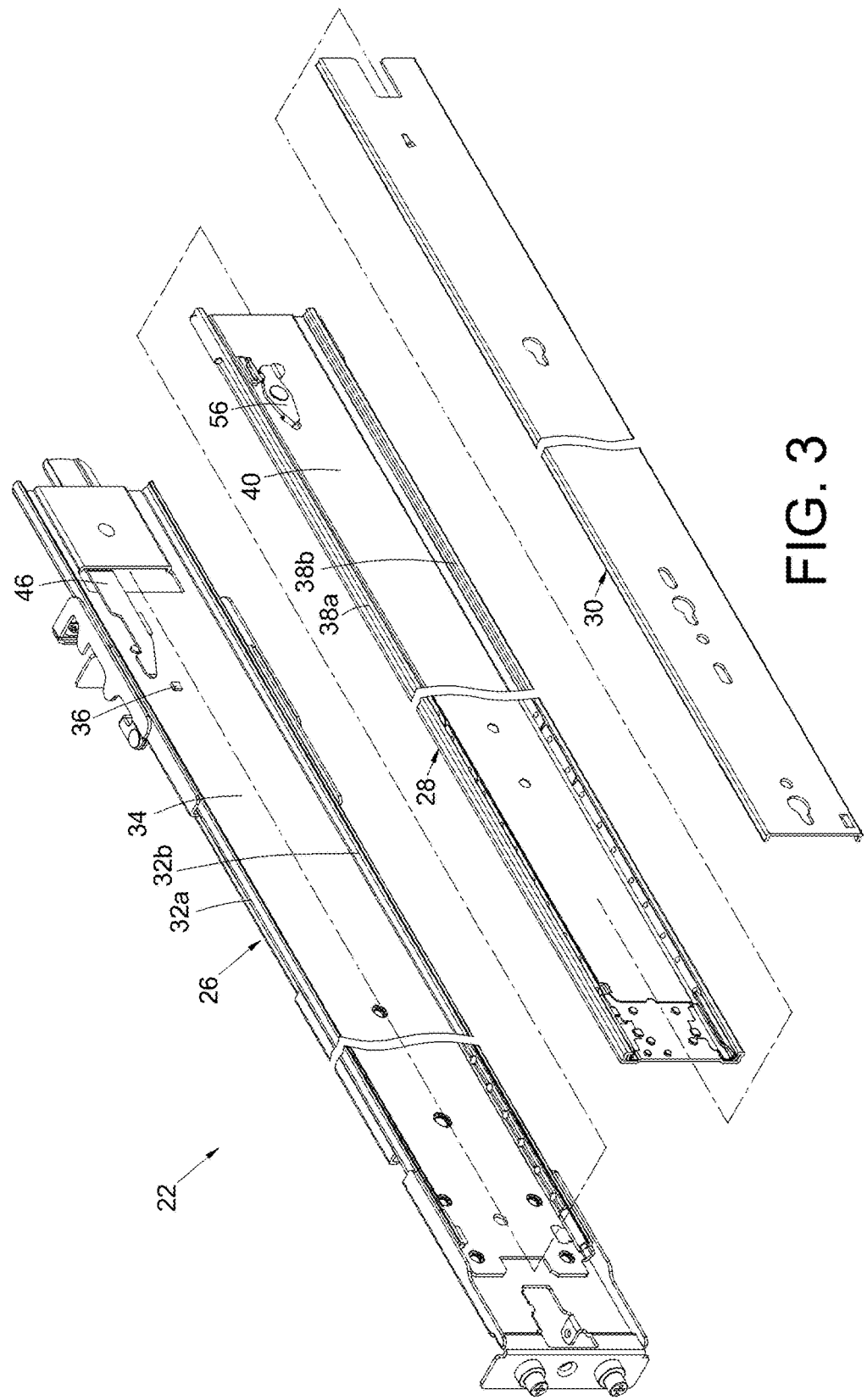
FIG. 3 is an exploded view of the slide rail assembly according to an embodiment of the present invention.

As shown in FIG. 3, the slide rail assembly 22 of the present invention comprises a first rail 26, a second rail 28 and a third rail 30. The first rail 26 comprises a first upper wall 32a, a first lower wall 32b and a first side wall 34 connected between the first upper wall 32a and the first lower wall 32b. In addition, the first rail 26 has a blocking part 36. The blocking part 36 is arranged on the first side wall 34 of the first rail 26 for example. The second rail 28 is movably connected to the first rail 26. The second rail 28 comprises a second upper wall 38a, a second lower wall 38b and a second side wall 40 connected between the second upper wall 38a and the second lower wall 38b. The third rail 30 is movably connected to the second rail 28.

Figure 4:
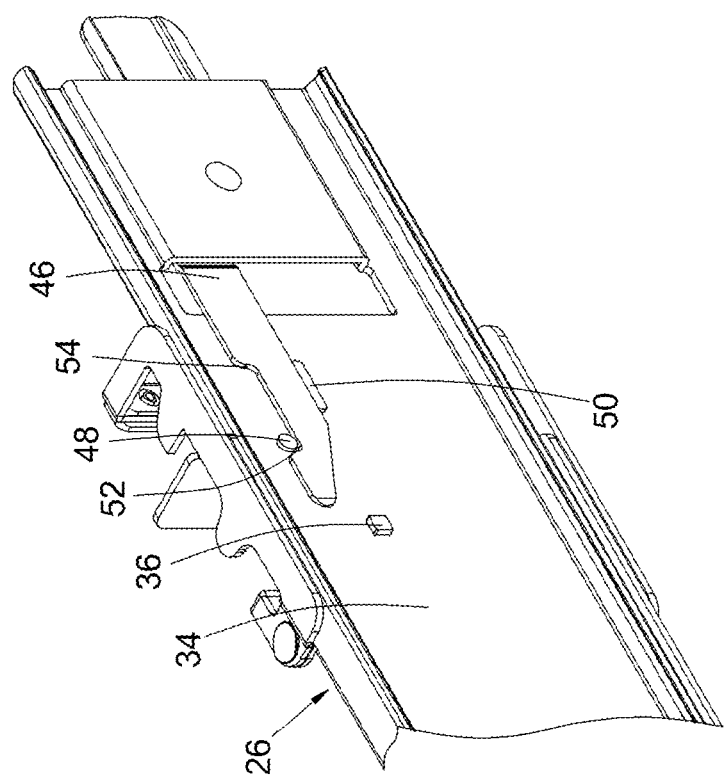
FIG. 4 is a diagram showing a portion of a first rail of the slide rail assembly in another view angle according to an embodiment of the present invention.

FIG. 4 further shows an engagement element 46 connected to the first rail 26. In addition, the first rail 26 has a first feature 48 and a second feature 50. The engagement element 46 is movably connected to the first rail 26 and located between the first feature 48 and the second feature 50 for linear movement. The engagement element 46 has a first blocking wall 52 and a second blocking wall 54 respectively located at two sides of the first feature 48 of the first rail 26.

Figure 5:
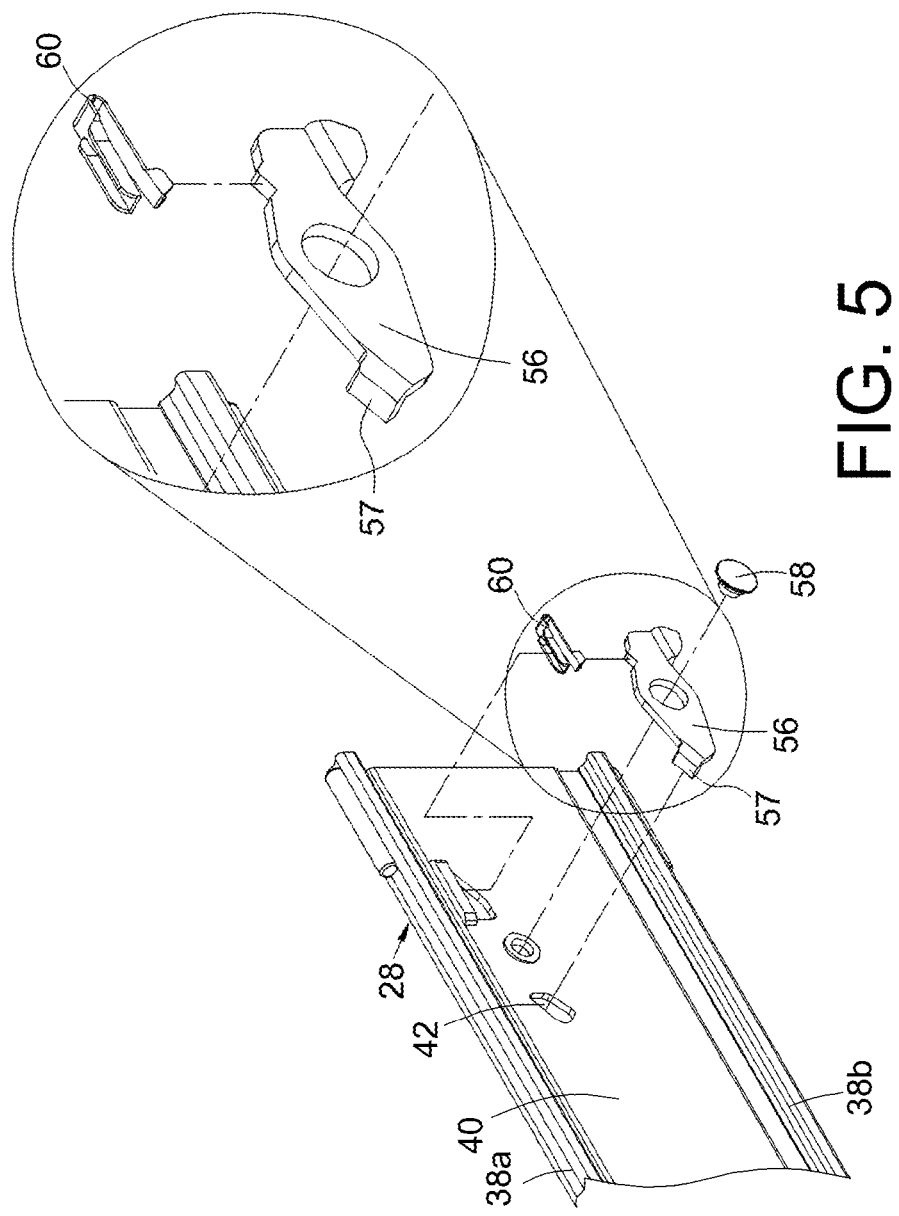
FIG. 5 is an exploded view illustrating installation of a blocking element on a second rail according to an embodiment of the present invention.

FIG. 5 further shows a blocking element 56 to be connected to the second rail 28. More particularly, the blocking element 56 is movably connected to the second rail 28 through a connection element 58. An elastic element 60 is configured to provide an elastic force to the blocking element 56, to position the blocking element 56 at a predetermined position relative to the second rail 28 in response to the elastic force of the elastic element 60. Wherein, the second rail 28 has a hole 42, and the hole 42 is arranged on the second side wall 40 of the second rail 28 for example. An extension part 57 of the blocking element 56 is configured to pass through the hole 42 of the second rail 28 for facing toward the first rail 26.

Figure 6:
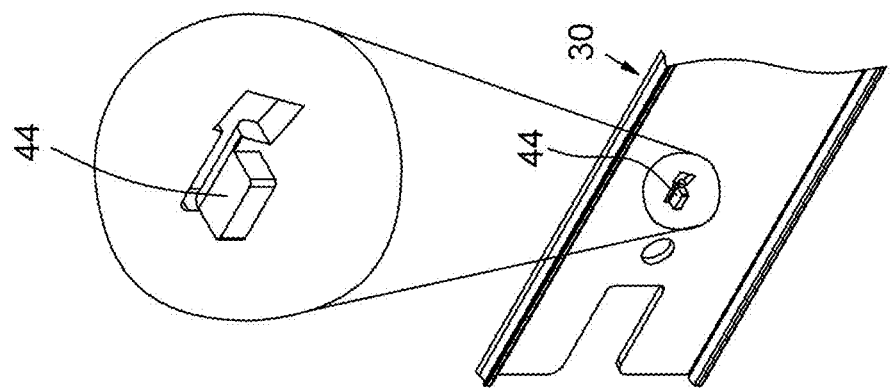
FIG. 6 is a diagram showing a portion of a third rail of the slide rail assembly in another view angle according to an embodiment of the present invention according to an embodiment of the present invention.

FIG. 6 further shows the third rail 30 having an abutting feature 44.

Figure 7:
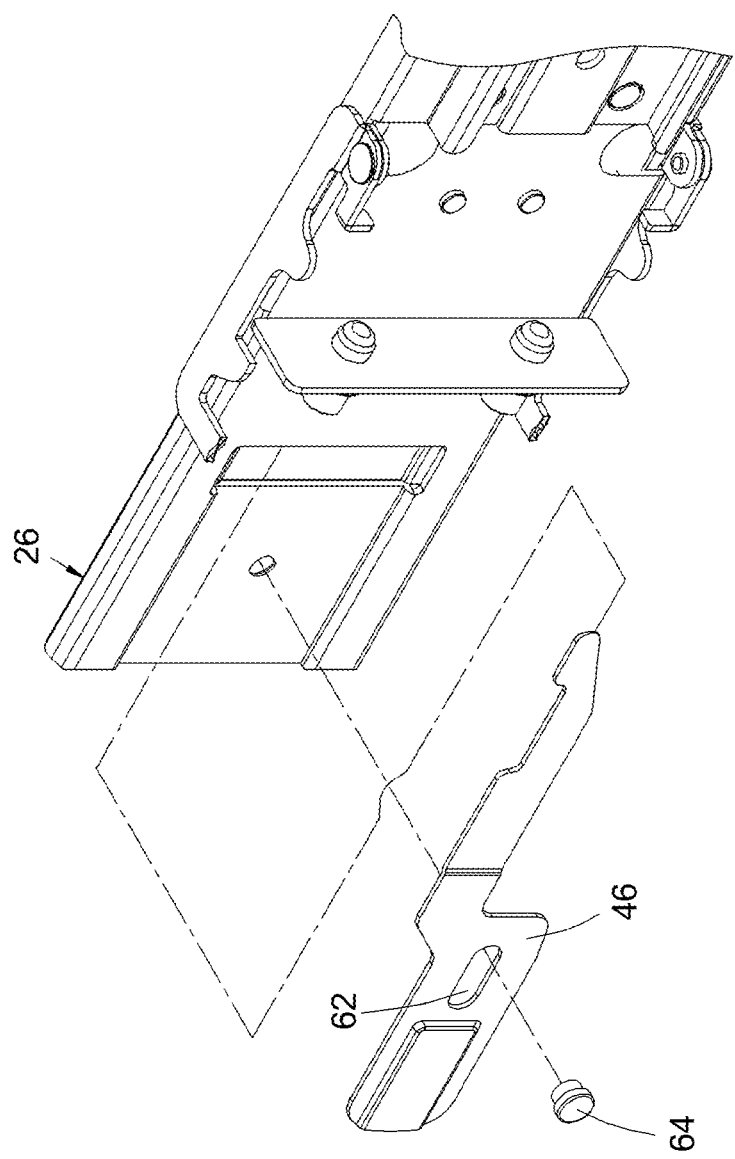
FIG. 7 is an exploded view illustrating installation of an engagement element on the first rail according to an embodiment of the present invention.

FIG. 7 further shows the engagement element 46 having an extension hole 62. Through arranging a connection element 64 to pass through the extension hole 62, the engagement element 46 is connected to the first rail 26 by the connection element 64, for allowing the engagement element 46 to move relative to the first rail 26 within a limited space.

Figure 8:
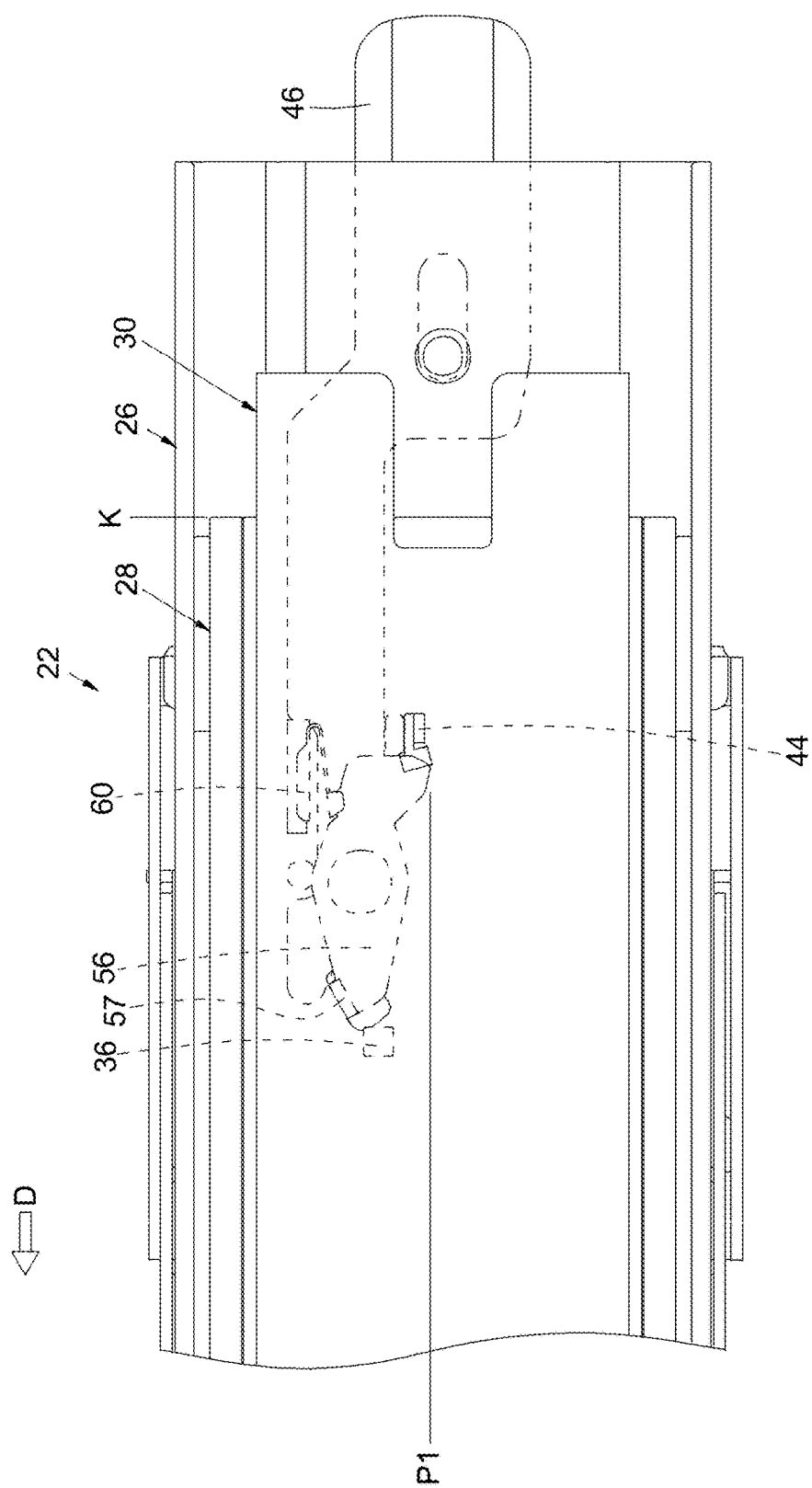
FIG. 8 is a diagram showing the blocking element located at a first predetermined position with an abutting feature facing toward the blocking element when the slide rail assembly is located at a retrieve position according to an embodiment of the present invention.

As shown in FIG. 8, the second rail 28 of the slide rail assembly 22 is located at a retrieve position K relative to the first rail 26. On the other hand, the blocking element 56 is located at a first predetermined position P1 relative to the second rail 28 in response to the elastic force of the elastic element 60. When the blocking element 56 is located at the first predetermined position P1, the abutting feature 44 of the third rail 30 faces toward the blocking element 56 (at least some part of the abutting feature 44 is aligned to the blocking element 56 along an extension direction D). Therefore, when the third rail 30 is pulled out from the retrieve position K to move relative to the second rail 28 along the extension direction D, the abutting feature 44 of the third rail 30 abuts against the blocking element 56 for driving the second rail 28 to move with the third rail 30 synchronously.

Figure 9:
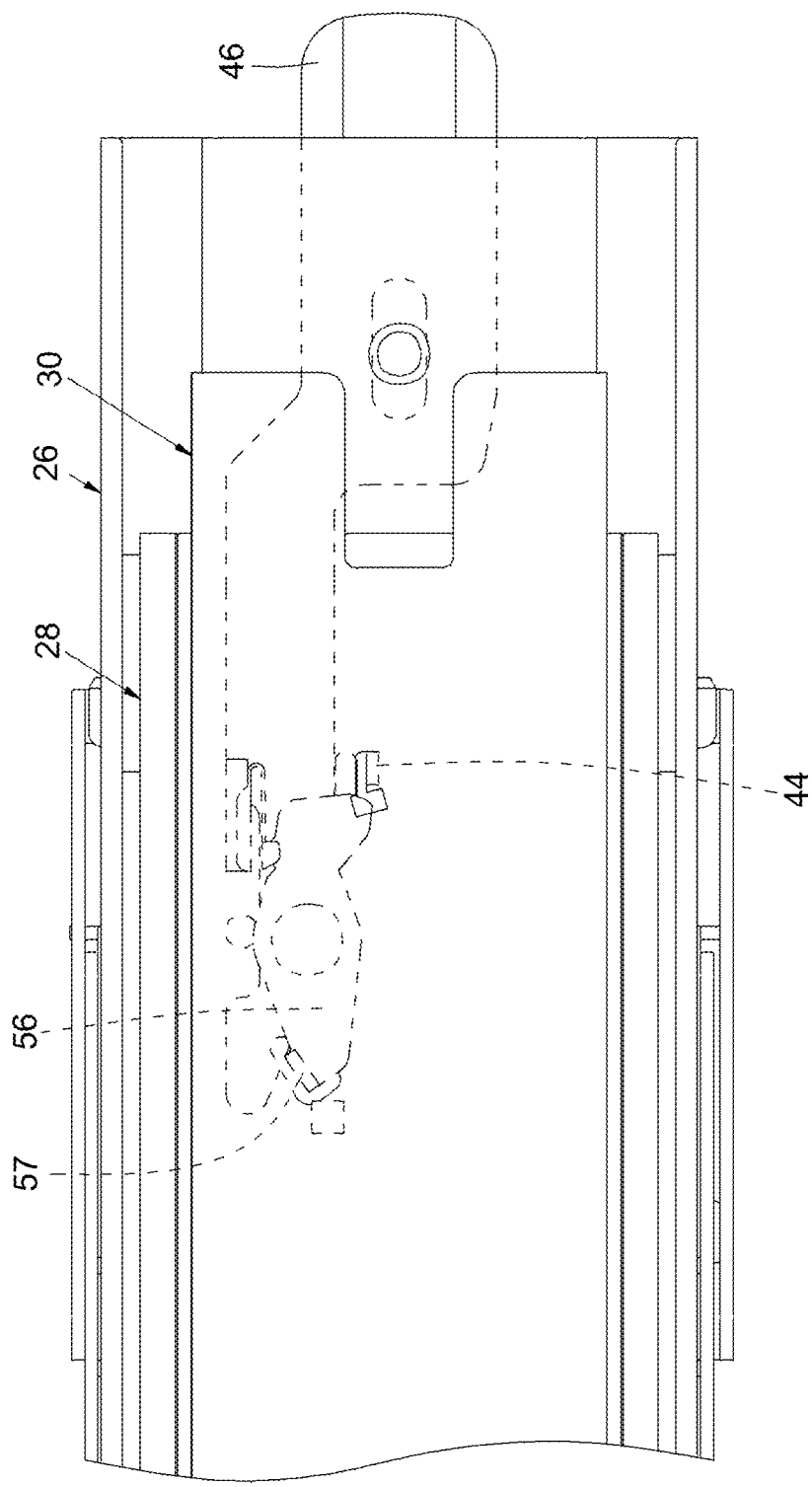
FIG. 9 is a diagram showing the engagement element being operated to move to a position according to an embodiment of the present invention.
Figure 10:
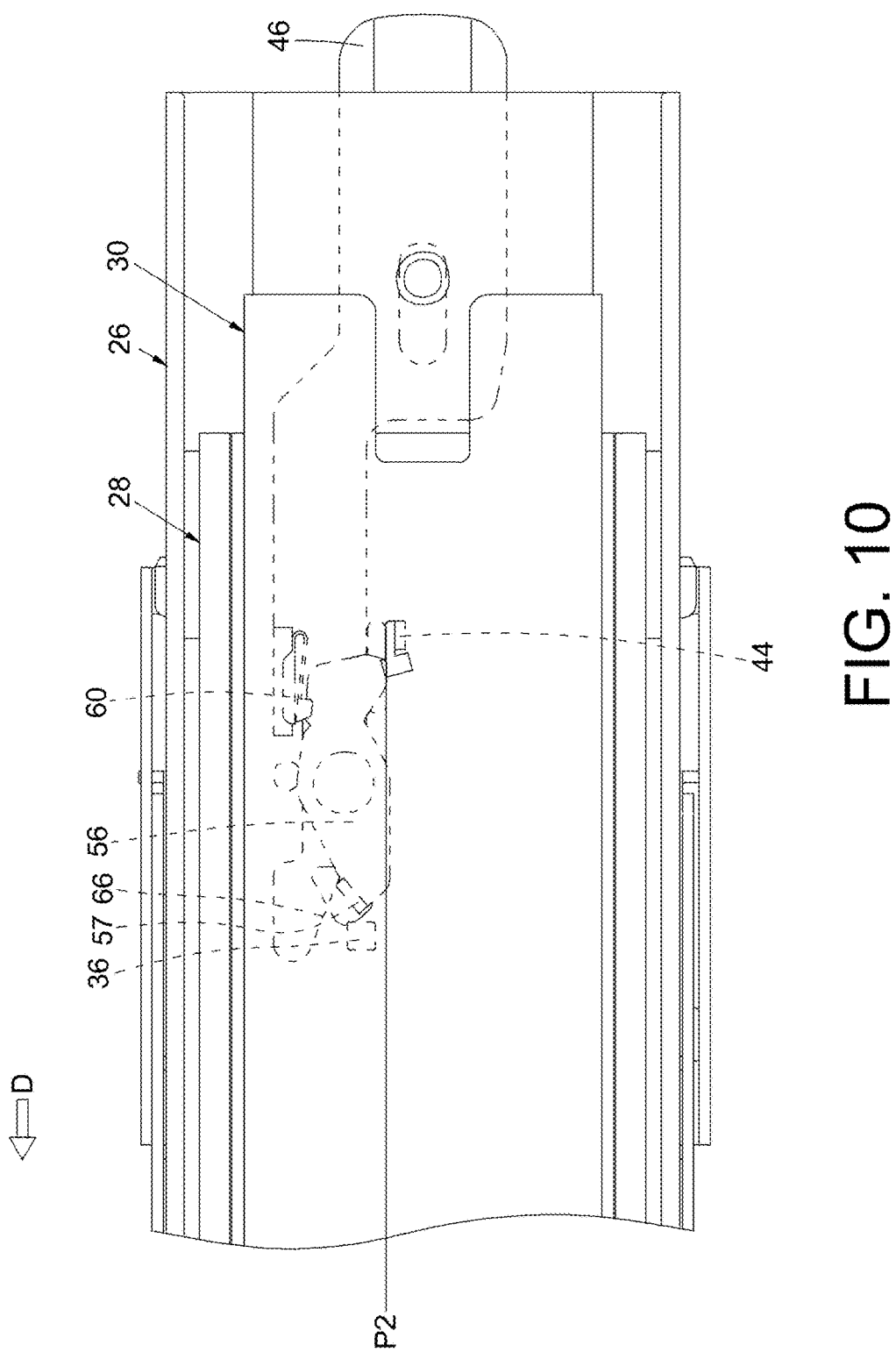
FIG. 10 is a diagram showing the engagement element being operated for moving the blocking element to a second predetermined position with the abutting feature no longer abutting against the blocking element according to an embodiment of the present invention.

As shown in FIG. 9 and FIG. 10, the engagement element 46 is operatively connected to the blocking element 56 for moving the blocking element 56 from the first predetermined position P1 to a second predetermined position P2 relative to the second rail 28, such that the extension part 57 of the blocking element 56 faces toward the blocking part 36 of the first rail 26 (at least some part of the extension part 57 of the blocking element 56 is aligned to the blocking part 36 along the extension direction D). Wherein, one of the engagement element 46 and the blocking element 56 has an inclined guiding part 66. In the present embodiment, the engagement element 46 has the inclined guiding part 66 for example. The blocking element 56 can be easily moved to the second predetermined position P2 from the first predetermined position P1 through guiding of the inclined guiding part 66. When the blocking element 56 is located at the second predetermined position P2, the extension part 57 of the blocking element 56 faces toward the blocking part 36 of the first rail 26. On the other hand, when the blocking element 56 is located at the second predetermined position P2, the abutting feature 44 of the third rail 30 no longer faces toward the blocking element 56.

Figure 11:
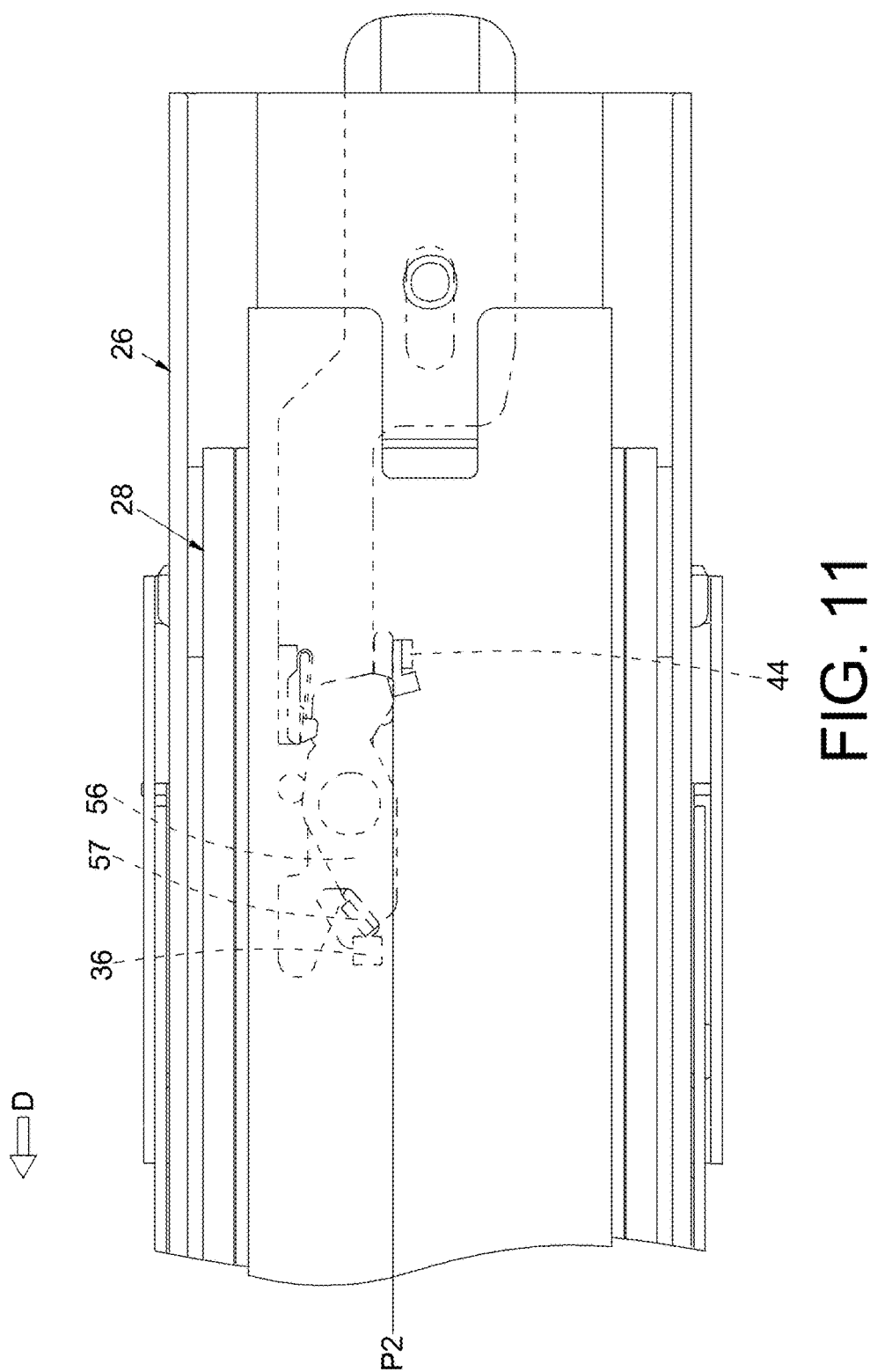
FIG. 11 is a diagram showing the blocking element abutting against a blocking part of the first rail according to an embodiment of the present invention.

As shown in FIG. 11, when the blocking element 56 is located at the second predetermined position P2, and the second rail 28 moves relative to the first rail 26 along the extension direction D, the extension part 57 of the blocking element 56 abuts against the blocking part 36 of the first rail 26, for preventing the second rail 28 from moving relative to the first rail 26 along the extension direction D. In other words, the above operation mode, extension length of the slide rail assembly can be adjusted and shortened, in order to meet various requirements in different environments. For example, when operating in a limited space, the above operation mode can meet the requirement.

Figure 12:
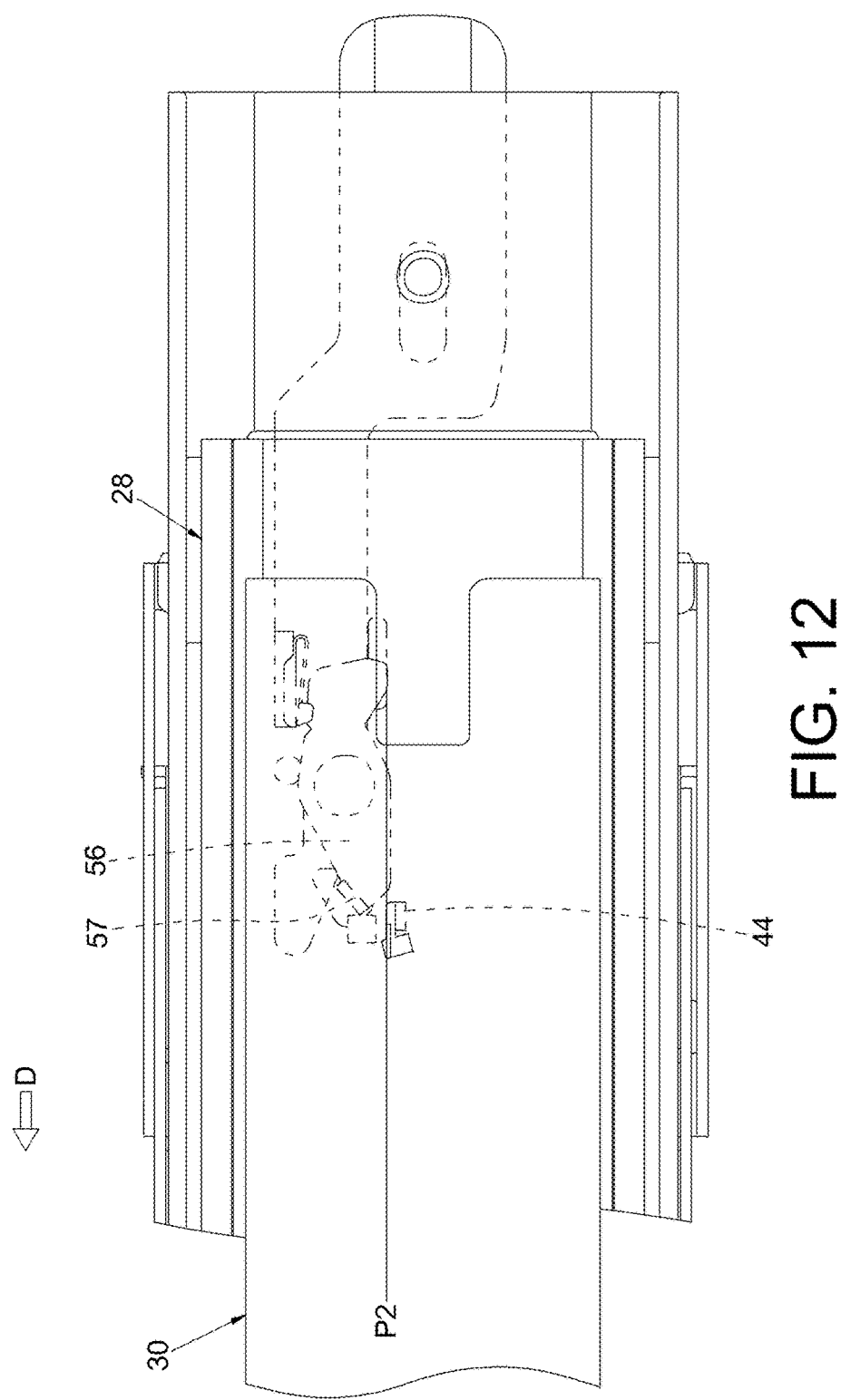
FIG. 12 is a diagram showing the third rail moving relative to the second rail along an extension direction according to an embodiment of the present invention.

As shown in FIG. 12, when the blocking element 56 is located at the second predetermined position P2, the abutting feature 44 no longer faces toward the blocking element 56. Therefore, only the third rail 30 can be moved relative to the second rail 28 along the extension direction D, and the second rail 28 is prevented from moving relative to the first rail 26 along the extension direction D.

Of course, as shown in FIG. 8, the engagement element 46 can also be operated to no longer guide the blocking element 56 to move, such that the blocking element 56 can be moved to the first predetermined position P1 from the second predetermined position P2 relative to the second rail 28 by the elastic force of the elastic element 60. Meanwhile, the extension part 57 of the blocking element 56 no longer faces toward the blocking part 36 of the first rail 26, and the abutting feature 44 of the third rail 30 faces toward the blocking element 56 again. Therefore, when the third rail 30 is pulled out from the retrieve position K to move relative to the second rail 28 along the extension direction D, the abutting feature 44 abuts against the blocking element 56, for driving the second rail 28 to move with the third rail 30 synchronously. Through the above operation mode, extension length of the slide rail assembly can be adjusted to recover to the original extension length, in order to meet various requirements in different environments.

According to the above illustration, the extension length of the slide rail assembly can be adjusted according designs of the embodiments of the present invention, in order to meet various requirements in different environments.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail having a blocking part;
a second rail movably connected to the first rail;
a blocking element connected to the second rail; and
an engagement element movably connected to the first rail;
wherein when the second rail is located at a retrieve position relative to the first rail, the engagement element is operatively connected to the blocking element for moving the blocking element from a first predetermined position to a second predetermined position relative to the second rail, and when the second rail is moved relative to the first rail along an extension direction, the blocking element abuts against the blocking part of the first rail, for preventing the second rail from moving relative to the first rail along the extension direction;
wherein when the engagement element is operated to move the blocking element apart from the second predetermined position relative to the second rail, the second rail is able to move relative to the first rail along the extension direction.

2. The slide rail assembly of claim 1 further comprising a third rail movably connected to the second rail.

3. The slide rail assembly of claim 2, wherein the third rail has an abutting feature, when the blocking element is located at the first predetermined position, the abutting feature abuts against the blocking element for driving the second rail to move with the third rail synchronously.

4. The slide rail assembly of claim 1, wherein the first rail has a first feature and a second feature, the engagement element is movably connected to the first rail between the first feature and the second feature.

5. The slide rail assembly of claim 4, wherein the engagement element has a first blocking wall and a second blocking wall respectively located at two sides of the first feature of the first rail.

6. The slide rail assembly of claim 1 further comprising an elastic element for providing an elastic force to the blocking element to position the blocking element at the first predetermined position relative to the second rail in response to the elastic force of the elastic element.

7. The slide rail assembly of claim 1, wherein one of the engagement element and the blocking element has an inclined guiding part for guiding the blocking element to easily move to the second predetermined position from the first predetermined position.

8. The slide rail assembly of claim 1, wherein the second rail has a hole for allowing an extension part of the blocking element to pass through for facing toward the first rail.

9. A slide rail assembly, comprising:
a first rail having a blocking part;
a second rail movably connected to the first rail;
a blocking element connected to the second rail;
an engagement element movably connected to the first rail; and
a third rail movably connected to the second rail, the third rail having an abutting feature;
wherein when the second rail is located at a retrieve position relative to the first rail, the abutting feature of the third rail abuts against the blocking element for driving the second rail to move with the third rail synchronously;
wherein when the second rail is located at the retrieve position relative to the first rail, and the engagement element is operatively connected to the blocking element for driving the blocking element to abut against the blocking part of the first rail with the abutting feature of the third rail no longer abutting against the blocking element, the second rail is prevented from moving relative to the first rail along an extension direction with the third rail being able to move relative to the second rail along the extension direction.

* * * * *